United States Patent Office 3,340,952
Patented Sept. 12, 1967

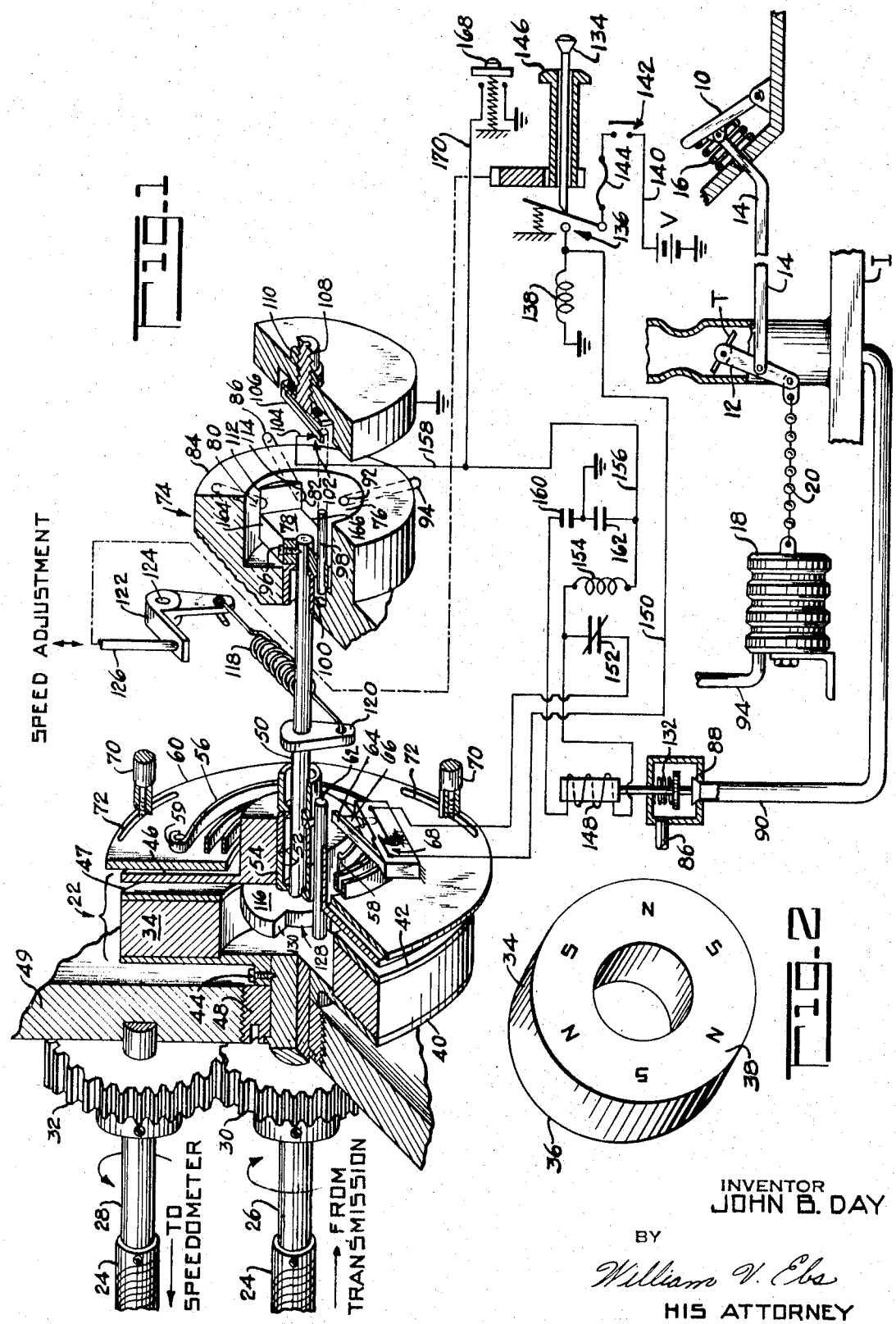

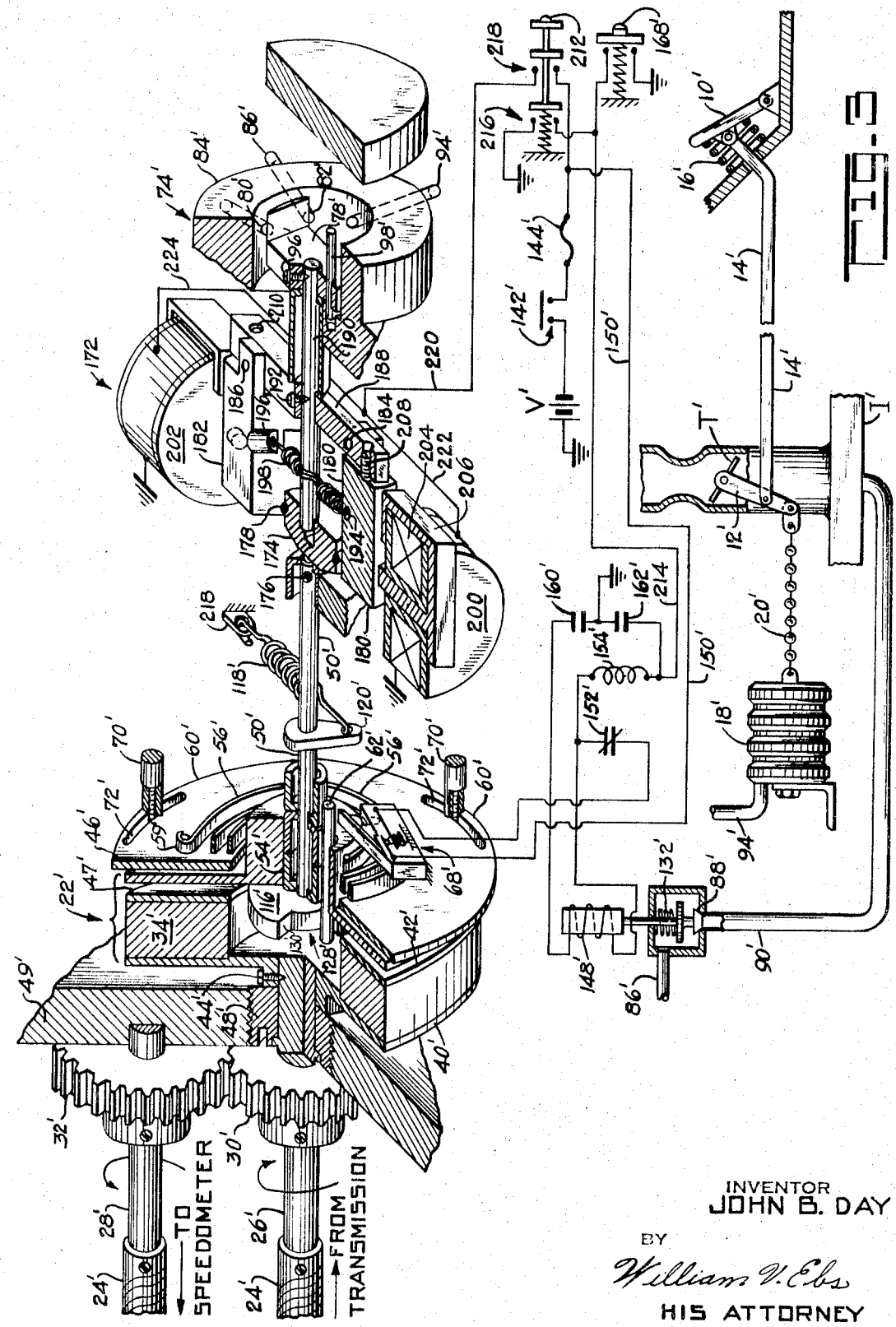

3,340,952
VEHICLE SPEED CONTROL SYSTEM
John B. Day, Columbus, Ohio, assignor, by mesne assignments, to Curtiss-Wright Corporation, Wood-Ridge, N.J., a corporation of Delaware
Filed Nov. 16, 1965, Ser. No. 508,051
13 Claims. (Cl. 180—108)

My invention is directed to a speed control system for automotive vehicles and is of the type disclosed, for example, in Patent No. 3,185,248 for Vehicle Speed Governors and Controls, of Donald J. Baxter issued May 25, 1965 and the patent application, Ser. No. 261,427, of Donald J. Baxter for Speed Governors and Controls, filed Feb. 27, 1963, now Patent No. 3,245,494.

It is a prime object of the invention to provide an improved speed control system for automotive vehicles requiring only simple and inexpensive components.

It is another object of the invention to provide an improved automotive vehicle speed control system which regulates vehicle speed according to the net effect on a control element of two opposing torques, one of which represents actual vehicle speed and the other of which represents a desired speed.

It is still another object of the invention to provide an automotive vehicle speed control system wherein opposing torque signals representing actual vehicle speed and a desired speed operate a valve member to control the application of fluid pressure to a servo motor and thereby the position of a throttle connected with the servo motor to control speed.

It is a further object of the invention to provide such a control system which can be instantaneously conditioned to maintain the operating speed of vehicle substantially constant.

Other objects and advantages of the invention will become apparent during a reading of the specification taken in connection with the accompanying drawings in which:

FIG. 1 is a diagrammatic view partially in perspective showing an automatic control system according to the invention;

FIG. 2 is a perspective view showing a component of the system of FIG. 1; and

FIG. 3 is a diagrammatic view partially in perspective showing another embodiment of the invention.

Referring to FIG. 1 of the drawings, reference character T designates an engine throttle which, as shown, is arranged for conventional control by an accelerator pedal 10, the throttle being connected to the pedal by way of arm 12 and link 14. Depression of the pedal 10 opens the throttle T against the force of return spring 16 which tends to maintain the throttle in its illustrated idle position. The throttle is also operable by automatic governor mechanism including a servo motor such as a flexible bellows 18 of the type shown in U.S. Patents 2,990,825 and 3,023,828 issued July 4, 1961 and Mar. 6, 1962, respectively, and in the aforementioned patent application. Throttle T connects with the bellows 18 through beadchain 20 and is movable by the bellows out of its illustrated idle position into more open governing positions against the spring 16.

The governor mechanism is provided with a coupling of a type wherein an input member upon rotation relative to an output member acts upon the output member with a torque which is a measure of the speed of rotation of the input member. An electromagnetic coupling such as eddy current drag coupling 22 shown connected to the speedometer cable 24 of a vehicle through shafts 26 and 28 and engaged gears 30 and 32 is an example of such a coupling.

Coupling 22 is conventional in construction. It includes a disc magnet 34 of a well known type having a plurality of permanently magnetized portions which form magnetic poles at the end faces as shown. The disc magnet 34 is secured at the end faces 36 and 38 to plates 40 and 42 respectively. Plate 40 is affixed to shaft 26 as by set screw 44 to provide for rotation of the disc magnet by the speedometer cable 24. The eddy current drag coupling also includes copper disc 46 which coacts with the disc magnet 34 as the disc magnet is rotated by the speedometer cable. The disc is axially spaced from plate 42 by an air gap 47 which can be adjusted during assembly as required for proper operation of the coupling by means of screw 48 in fixed structure 49.

Rotation of the disc magnet results in a torque on disc 46 in the direction of rotation of the disc magnet due to eddy currents induced in the disc, as lines of flux from the disc magnet cut across the disc, and the resulting reaction between the currents in the disc and magnetic flux producing them. An increase in the speed of rotation of the disc magnet results in an increased torque on disc 46, and a decrease in the speed of rotation of the disc magnet causes torque on disc 46 to decrease. Preferably, the torque on disc 46 is rendered independent of temperature changes in the disc magnet 34 by the known technique of fabricating plate 42 from a material having a magnetic permeability which varies in such manner as to compensate for any temperature changes affecting flux produced by the disc magnet and maintain the lines of flux cutting the disc constant.

Disc 46 is rotatably mounted on a shaft 50 by means of bearings 52 which are tightly fitted in bore 54 and turn with the disc. A preloaded torsion spring 56 has one end 58 secured to the disc 46 and the other end 59 secured to a normally fixed plate 60, as shown. At all speeds less than a predetermined low speed such as 20 miles per hour, as determined by the preload on spring 56, the disc 46 is maintained by spring 56 in a position wherein a pin 62 secured in the disc bears against flexible arm 64 and in effective to cause the arm acting through element 66 to hold switch 68 open. At greater speeds, the torque produced on disc 46 due to rotation of disc magnet 34 is sufficient to overcome the preload tension in spring 56 and pin 62 assumes a position permitting the switch to close.

Plate 60 is mounted on screws 70 extending through slots 72 in the plate and into fixed structure (not shown); and tension in spring 56 can be adjusted to change the speed at which switch 68 opens and closes by turning plate 60 with the screws loosened and then tightening the screws to lock the plate in place in the adjusted position.

In addition to bellows 18 and coupling 22, the governor mechanism includes a rotary valve 74 having a pressure chamber 76 wherein a movable valve member 78 cooperates with ports 80 and 82 formed in the valve casing 84. Port 80 connects with atmospheres whereas port 82 connects through passage 86, valve 88 (when open), and passage 90 with the engine manifold I. An opening 92 in the valve casing connects through passage 94 with bellows 18. As shown, movable valve member 78 is affixed by set screw 96 to shaft 50 for actuation thereby. A pin 98 secured in the movable valve member extends into an annular recess 100 formed in the valve casing 84 to define limiting positions for the valve member beyond its normal operating range. The rotary valve includes a switch 102 comprising contact 104 and a switch arm 106 actuable into engagement with the contact. Switch arm 106 is set by means of screw 108 and nut 110 for actuation by pin 96 when edges 112 and 114 of the movable valve member lie across the ports 80 and 82, respectively.

The rotary valve connects through shaft 50 with a drive wheel 116 housed within the eddy current drag coupling 22, and with a speed setting spring 118 which exerts a torque on the shaft in a direction opposite to the direction of rotation of magnet 34. As shown, one end of the spring connects with an arm 120 on shaft 50 and the other end connects with a bellcrank 122 which can be angularly positioned on pivot 124 by means of control rod 126 to set tension in the spring. The helical spring 118 which is shown in the drawing is, of course, but one example of a speed setting spring suitable for use in the device of the invention. A torsion spring having one end operatively connected with shaft 50 and the other end operatively connected to control means for setting tension in the spring is another.

At speeds less than the predetermined low speed established by the preload on torsion spring 56, the shaft 50 and attached wheel 116 are maintained by spring 118 in an extreme position defined by the engagement of pin 98 with the lower end of recess 100, and notch 128 in the wheel is so located that its upper end 130 is just out of contact with pin 62 which is then maintained by the action of spring 56 on disc 46 in a position substantially defined by the engagement of the pin 62 with arm 64. The spring 118 therefore exerts no torque on disc 46 at speeds less than the said predetermined low speed, and it has no effect upon the operation of switch 68. The switch 68 closes when vehicle speeds exceeds the predetermined low speed established by spring 56 and opens when vehicle speed falls below such speed as already mentioned, notwithstanding tension in spring 118. At speeds in excess of the predetermined low speed, pin 62 engages the upper end 130 of notch 128 and exerts a torque proportional to vehicle speed on drive wheel 116 and shaft 50 tending to turn the wheel and shaft in the direction of motion of disc 46, and speed setting spring 118 exerts a torque thereon in the opposite direction.

The governor mechanism is rendered effective to automatically control speed by the operation of valve 88. When the valve is closed, there is no communication between the engine manifold I and port 82 in rotary valve 74, and automatic control isn't possible. However, when the valve is open, there is such communication and the governor mechanism can operate to maintain a desired speed. As shown, the valve 88 is biased to a closed position by spring 132.

The system is readied for automatic control by depressing button 134 to close switch 136. A circuit which energizes coil 138 to maintain the switch closed after the button is released is thereby completed from battery V to ground over wire 140, ignition switch 142 (provided the switch is closed), fuse 144, switch 136 and the coil 138. A control speed is then selected for the system by adjusting tension in speed setting spring 118 with dial 146 which connects with control rod 126.

With the system readied by the operation of button 134 and the speed setting spring in its adjusted position, automatic control is initiated (providing the selected speed is greater than the predetermined low speed established by torsion spring 56) by operating the vehicle with the accelerator pedal to attain a speed sufficient to move pin 98 away from its position of engagement with the lower end of recess 100 into a position to actuate switch arm 106 and close switch 102. When switch 102 closes, it completes an energizing circuit for coil 154 extending from battery V to ground over line 140, ignition switch 142, fuse 144, switch 136, line 150, switch 68, normally closed brake switch 152, the holding coil 154, line 156 and line 158. Coil 154 closes conventionally arranged contacts 160 and 162 whereupon solenoid coil 148 is picked up by the completion of a holding circuit for the coil 148 extending from battery V to ground over line 140, ignition switch 142, fuse 144, switch 136, line 150, switch 68, brake switch 152, the solenoid coil 148 and contact 160. The solenoid coil 148 opens valve 88 to establish communication between the rotary valve 74 and bellows 18, and thereafter the bellows operates to control the position of the throttle T according to pressure in the valve as determined by the position of movable valve member 78.

When communication is established between the bellows 18 and the rotary valve 74 by the operation of valve 88, movable valve member 78 is automatically caused to assume a position (such as shown in FIG. 1) wherein the bellows 18 is rendered effective to dispose the throttle T so as to cause the vehicle to run at the speed for which the spring 118 has been adjusted. Regardless of the speed for which the spring has been adjusted, the position assumed by the valve member 78 is within the limits of an operating range wherein any movement of the valve member in one direction is effective to produce an increase in speed and any movement of the valve member in the opposite direction is effective to result in a decrease in vehicle speed. Preferably, such operating range is small, such as a few degrees or less as in the valve illustrated, and preferably within said operating range both valve edges 112 and 114 always overlie the associated ports, that is, ports 80 and 82, respectively.

After automatic control has been initiated, any slight change in vehicle speed due, for example, to a change in the inclination of the roadway results in a compensating movement of a valve member 78. A speed increase results in the valve member 78 being moved to increase the effective opening of port 80 and decrease the effective opening of port 82 whereby pressure is increased in the valve chamber 76 and the bellows 18 connected thereto. The bellows expands and spring 16 moves the throttle in a direction to decrease vehicle speed. A speed decrease results in the valve member 78 being moved to increase the effective opening of port 82 and decrease the effective opening of port 80 whereby pressure is decreased in the valve chamber 76 and the bellows 18 such that the bellows becomes effective to move the throttle in a direction to increase vehicle speed.

Preferably, the valve member 78 is formed with fine edges at 112 and 114 to prevent pressures in the immediate region of the ports from exerting a net torque on the movable valve member. All parts of the movable valve member not in the immediate vicinity of ports 80 and 82 are exposed to the same pressures since the valve operates in a single chamber. Forces acting on opposite end surfaces 164 and 166 cancel and the valve member is for the most part nicely balanced in a rotational sense.

Application of the brake opens the energizing circuit for coil 154 and holding circuit for solenoid coil 148 at brake switch 152 and valve 88 closes to discontinue automatic speed control. A resumption of automatic speed control may be readily achieved after release of the brake, however, by operating resume speed button 168 providing the vehicle has not been slowed down by the application of the brake to the low predetermined speed at which switch 68 opens. Operation of the button 168 completes an energizing circuit for the solenoid coil 154 extending from battery V over line 140, ignition switch 142, fuse 144, switch 136, line 150, switch 68, brake switch 152, coil 154, line 156, line 170, and the contacts of the button 168 to ground. The holding circuit for coil 148 is established as before. The solenoid coil 148 opens valve 88 and automatic speed control is resumed. Rapid acceleration from a standstill or a low speed upon operation of the resume speed button would create a dangerous condition; however, protection is afforded against this condition by switch 68 which prevents the completion of an energizing or holding circuit for coil 148 at less than the low speed established by torsion spring 56.

Reference is now made to FIG. 3 showing a modified form of control system according to the invention, particulrly adapted to enable a driver to quickly and easily select the operating speed of a vehicle as the control speed.

In FIG. 3, illustrated parts corresponding to those shown in FIG. 1 are designated by the same reference characters, except for the addition of a prime mark (')
thereto. As shown, the system of FIG. 3 includes an eddy
current drag coupling 22' like that provided in the system
of FIG. 1, and a rotary valve 74' which differs from the
rotary valve of FIG. 1 only in that there is no electrical
switch actuable by the movable valve member. A clutch
172 is provided for disconnecting and reconnecting movable valve member 78' and drive wheel 116'.

The clutch 172 includes input wheel 174 which is affixed to the shaft 50' as at 176. A friction ring 178 is
provided at the periphery of the wheel for engagement
with clutch arms 180 and 182 which are pivotally
mounted at 184 and 186, respectively, on a member 188
that is secured to shaft 190 at 192. The arms 180 and 182
are connected at 194 and 196 to spring 198 and urged
thereby into engagement with friction ring 178. Suitable
means such as electromagnets 200 and 202 are, however,
provided for moving the arms 180 and 182 out of engagement with the friction ring. The arms 180 and 182
are fabricated of a material having a high permeability
for cooperation with the electromagnets, each of which
includes a wire coil such as 204 and a soft iron element
such as 206 arranged, as shown, to establish a magnet
circuit around the soft iron element and through an adjacent arm of the clutch upon energization of the coil
whereby the arm is attracted to the soft iron element.

The electromagnets are normally de-energized such
that shaft 190 and movable valve member 78' secured
thereon are connected through the clutch (at friction ring
178) with shaft 50' and the drive wheel 116'. When the
coils of the electromagnets are energized, the movable
valve element 78' and shaft 190 are disconnected from
shaft 50' and drive wheel 116' since the friction ring 178
is then out of contact with the clutch arms. Energization
of the coils causes the clutch arms 180 and 182 to be
pivoted into positions wherein they contact screw stops
208 and 210, respectively, which prevent the arms from
engaging the electromagnets. In addition, the arms and
member 188 are moved about the rotational axis of the
clutch as required to precisely align the arms 180 and 182
with the axis of the coils. In such aligned position, the
valve member 78' is disposed in an intermediate position
within the small operating range of the valve.

With vehicle speed in excess of a predetermined low
speed established by torsion spring 56', automatic speed
control may be initiated to maintain the vehicle at the
operating speed by depressing button 212. An energizing
circuit is thereby completed for coil 154' from battery V'
to ground, over ignition switch 142', fuse 144', line 150',
switch 68', normally closed brake switch 152', coil 154',
line 214 and switch 216. Coil 154' closes contacts 160'
and 162' whereupon a holding circuit is established for
solenoid coil 148' between battery and ground over ignition switch 142', fuse 144', line 150', switch 68', brake
switch 152', the solenoid coil 148' and contact 160'. Solenoid coil 148' then opens valve 88' to connect engine
manifold I' with the valve port 82' through passages 90'
and 86'. Depression of button 212 also completes an energizing circuit for the normally de-energized coils 200
and 202 of the clutch electromagnets which energizing
circuit extends from battery V' to ground over ignition
switch 142', fuse 144', switch 218, line 220, and the lines
222 and 224. The electromagnets operate to disconnect
shaft 50' and valve 78', and align arms 180' and 182' with
the axis of the clutch coils whereby the movable valve
member 78' is disposed in a position (such as shown in
FIG. 2) within the operating range required for control
of the vehicle.

Upon the release of button 212, the energizing circuit
for the electromagnetic coils opens at switch 218 and the
clutch closes to connect movable valve member 78' with
drive wheel 116'. At the time button 212 is released,
spring 118', which connects at one end with shaft 50'
through arm 120' and has the other end secured to a fixed
member 218, is loaded in tension to a degree determined
according to the operating speed of the vehicle, and movable valve member 78' is within its operating range.
Valve member 78' reconnects with shaft 50' when button
212 is released and is caused to assume the position required to operate the vehicle so as to balance tension
in spring 118'. Any initial adjustment in its position occurring upon the release of button 212 does not appreciably affect the preload on the spring established at the
operating speed existing at the time of operation of button 212, assuming the operating range of the valve member 78' is small, such as a few degrees or less, as in the
device of the drawing. Any subsequent increase in vehicle
speed with respect to such operating speed therefore results in movement of valve member 78' in a direction to
increase the effective opening of port 80' and decrease
the effective opening of port 82' whereby pressure in bellows 18' is increased and the bead-chain 20' relaxed.
The spring 16' then acts to decrease the opening of
throttle T' and reduce speed. Any decrease in vehicle
speed with respect to said operating speed results in movement of the valve member 78' in a direction to increase
the effective opening of port 82' and decrease the effective
opening of port 80'. Vacuum in bellows 18' is increased
and the throttle T' is moved in a direction to increase
speed. The vehicle is therefore maintained at substantially
the speed existing at the time of operation of button 212.

Operation of the brake interrupts automatic control by
opening the energizing circuit for coil 154' and the holding circuit for solenoid coil 148' at the brake switch 152'.
Automatic control may, however, be resumed by momentarily depressing resume speed button 168' to re-energize
coil 154' and once again establish the holding circuit for
solenoid coil 148' provided the vehicle has not been
slowed to a speed less than the predetermined low speed
established by spring 56'. Upon the resumption of automatic speed control, the vehicle accelerates to the speed
at which the vehicle was maintained prior to application
of the brake and is thereafter maintained at such speed
until button 212 is actuated to select another speed as
the control speed or the brake is applied.

It is to be noted that the clutch arms 180 and 182
might be adjusted relative to the movable valve member
78' and secured in a position by means of screw 192 or
96' such that upon operation of the button 212 the vehicle
would be caused to assume a speed which is slightly
higher, as, for example, by one or two miles per hour,
than the speed existing at the instant the button is depressed, if so desired. An operator would then be able to
increase vehicle speed in small increments from one control speed to another by repeatedly operating button 212
and without the necessity of using the accelerator pedal.

It is to be understood that the speed control system of
the invention, while illustrated and described in the environment of an automotive vehicle, also has application
in other environments. The control can be used advantageously, for example, in stationary systems wherein it
is desired to control the speed of a rotating shaft as, for
example, the shaft of a motor, generator or engine. In
such a system, the electromagnetic coupling in the device
of the invention would be driven by the shaft, the speed
of which is to be controlled, rather than in accordance
with the speed of a moving vehicle.

It should also be understood that while two embodiments of the invention have been shown and described,
various other embodiments are also possible, and that
various changes and modifications might be made by
those skilled in the art to the systems disclosed without
departing from the spirit and scope of the invention as
defined in the annexed claims.

I claim:
1. A speed control system for an automotive vehicle
comprising means for changing vehicle speed; motor
means operatively connected to the speed changing
means; a control element for the motor means, connected
thereto and including an input-signal member having a small operating range, said input-signal member being operable in one direction to cause the motor means to adjust the speed changing means so as to increase vehicle speed and being operable in the other direction to cause the motor means to adjust the speed changing means so as to decrease vehicle speed; a coupling having an input member rotatable according to vehicle speed and an output member operably connected with the input-signal member for exerting a torque thereon varying according to vehicle speed and tending to move the input-signal member in a direction to cause the speed changing means to decrease vehicle speed; a speed setting spring connected with the input-signal member to exert a torque tending to move the input-signal member in a direction to cause the speed changing means to increase vehicle speed; and speed selecting means operably connected with the speed setting spring for adjusting the spring to vary the speed required to balance the torque exerted by the spring in an intermediate position of the input-signal member within said operating range.

2. A speed control system as defined in claim 1 wherein the control element is a valve which includes a pressure chamber that connects with the motor means, and two ports for admitting fluid at different pressures to the chamber; and wherein the input-signal member is a movable valve member having portions which overlie and cooperate with the ports to control pressure in the chamber.

3. The speed control system of claim 2 wherein said overlying portions of the movable valve member are formed with fine edges to prevent pressures at the ports from unbalancing the valve member.

4. A speed control system as defined in claim 1 wherein the speed setting spring has one end affixed to the speed selecting means and the other end operatively connected to the input-signal member.

5. A speed control system as defined in claim 1 including clutch means between the coupling and the input-signal member operable to disconnect the input-signal member from the output member of the coupling with said input-signal member outside said operating range and reconnect the input-signal member and the output member with the input-signal member in said operating range.

6. A speed control system as defined in claim 1 including clutch means between the coupling and the input-signal member, the clutch means including an input member operably connected with the output member of the coupling, an output member connected with the input-signal member of the control element, means normally maintaining the input and output clutch members engaged to render the input-signal member movable by the output member of the coupling, and means operable to disengage the input and output clutch members, dispose the clutch output member in a postion wherein the input signal member is in said operating range, and re-engage the input and output clutch members.

7. A speed control system for automotive vehicles comprising an electromagnetic coupling having an input member rotatable according to vehicle speed and an output member urged in the direction of rotation of the input member by a torque determined according to the speed of the input member, switch means, actuating means for the switch means, a preloaded spring connected with the output member of the coupling and acting on the such output member in a direction opposite to the direction of rotation of the input member of the coupling with a torque effective to maintain the actuating means in engagement with the switch means at vehicle speeds less than a predetermined speed, fluid control means including a rotary valve with an input-signal member, a speed setting spring connected to the valve input-signal member to urge the said input-signal member in a direction opposite to the direction of rotation of the input member of the coupling, stop means for holding the input-signal member against the force of the speed setting spring, means for mechanically connecting the input-signal member to the output member of the coupling, means for selectively preloading the speed setting spring, throttle actuating means including motor means for positioning the throttle according to the position of the input-signal member, and means operably connected with the switch means and fluid control means for preventing the rotary valve from controlling the throttle actuating means at vehicle speeds less than said predetermined speed.

8. A speed control system as defined in claim 7 including means for adjusting the preload on the first mentioned spring to thereby change the predetermined speed below which the actuating means and switch means are maintained in engagement.

9. A speed control system for a mechanism comprising speed changing means; a rotary valve for controlling the speed changing means, said rotary valve including an input-signal member operable in one direction to cause the speed changing means to decrease the speed of the mechanism and operable in the other direction to cause the speed changing means to increase the speed of the mechanism; an electromagnetic coupling including an input member rotatable according to the speed of the mechanism and an output member operably connected with the input-signal member for exerting a torque thereon varying according to said speed and tending to move the input-signal member in the direction to decrease the speed of the mechanism; a speed setting spring connected with the input-signal member to exert a torque tending to move the input-signal member in the direction to increase such speed; and means operably connected with the speed setting spring to select a speed for the mechanism above which the input-signal member is moved to decrease speed and below which the input-signal member is moved to increase speed.

10. A speed control system for a mechanism comprising speed changing means; a valve for controlling the speed changing means, said valve including an input-signal member operable in one direction to cause the speed changing means to decrease the speed of the mechanism and operable in the other direction to cause the speed changing means to increase the speed of the mechanism; a coupling including an input member rotatable according to the speed of the mechanism and an output member operably connected with the input-signal member for exerting a torque thereon varying according to said speed and tending to move the input-signal member in the direction to decrease the speed of the mechanism; a speed setting spring connected with the input-signal member and tending to move the input-signal member in the direction to increase such speed; and means operably connected with the speed setting spring to select a speed for the mechanism above which the input-signal member is moved to decrease speed and below which the input-signal member is moved to increase speed.

11. A speed control system for an automotive vehicle comprising speed changing means; a rotary valve for controlling the speed changing means, said rotary valve including an input-signal member operable in one direction to cause the speed changing means to decrease vehicle speed and operable in the other direction to cause the speed changing means to increase vehicle speed; an electromagnetic coupling including an input member rotatable according to vehicle speed and an output member operably connected with the input-signal member for exerting a torque thereon varying according to vehicle speed and tending to move the input-signal member in the direction to decrease vehicle speed; a speed setting spring connected with the input-signal member to exert a torque tending to move the input-signal member in the direction to increase speed; and clutch means between the electromagnetic coupling and the input-signal member operable to disconnect the input-signal member from the output member of the coupling and reconnect the input-signal member to said output member with the input-signal member in a new position relative to the output member whereby the vehicle may be caused to operate at a speed approximating the speed existing at the time of operation of the clutch.

12. A speed control system as defined in claim 11 wherein the clutch means includes an input member which is connected to the output member of the electromagnetic coupling and an output member which is adjustably connected to the input-signal member such that relative positions of the input-signal member and the output member of the clutch can be altered to cause the vehicle to increase speed upon operation of the clutch.

13. A speed control system comprising a throttle by means of which the speed of a mechanism may be varied, motor means operatively associated with the throttle; a control valve for the motor means connected thereto and including an input-signal member, said input-signal member being operable to adjust the motor means so as to limit the speed of the mechanism to a predetermined value; a coupling having an input member rotatable according to mechanism speed and an output member operably connected with the input-signal member for exerting a torque thereon varying according to said speed; a spring connected with the input-signal member to exert a torque on the input signal member tending to move the member in a direction opposite to the torque exerted thereon by the coupling; and means operably connected with the spring for adjusting the spring to set said predetermined speed.

References Cited
UNITED STATES PATENTS

| | | | |
|---|---|---|---|
| 2,961,230 | 11/1960 | Moro | 73—519 |
| 3,088,538 | 5/1963 | Brennan et al. | 180—109 |
| 3,229,546 | 1/1966 | Nallinger et al. | 180—105 X |
| 3,268,026 | 8/1966 | MacDuff et al. | 180—106 |
| 3,297,104 | 1/1967 | Fox | 180—109 |

KENNETH H. BETTS, *Primary Examiner.*